United States Patent
Kech et al.

(10) Patent No.: US 6,229,240 B1
(45) Date of Patent: May 8, 2001

(54) SPLIT-TUBE MOTOR

(75) Inventors: Hansjürgen Kech, Herdecke; Uwe Dreihaus, Hamm; Ingo Fabricius, Dortmund, all of (DE)

(73) Assignee: Wilo GmbH, Dortmund (DE)

( * ) Notice: Subject to any disclaimer, the term of this patent is extended or adjusted under 35 U.S.C. 154(b) by 0 days.

(21) Appl. No.: 09/410,002

(22) Filed: Sep. 30, 1999

(30) Foreign Application Priority Data

Oct. 5, 1998 (DE) .............................. 198 45 864

(51) Int. Cl.$^7$ ................................ H02K 3/46; H02K 5/00
(52) U.S. Cl. ....................... 310/194; 310/87; 310/254; 310/179; 310/42; 310/86; 310/89; 242/433; 417/321
(58) Field of Search .............................. 310/194, 87, 254, 310/42, 86, 89, 71, 180, 179; 417/423.1, 423.7, 423.14, 321; 29/596; 242/433

(56) References Cited

U.S. PATENT DOCUMENTS

| | | | |
|---|---|---|---|
| 2,506,629 | * 5/1950 | Bilde et al. | 310/194 |
| 3,914,859 | * 10/1975 | Pierson | 310/218 |
| 4,203,048 | * 5/1980 | Sato | 310/268 |
| 4,852,245 | * 8/1989 | Denk | 29/596 |
| 4,968,911 | * 11/1990 | Denk | 310/42 |
| 5,117,138 | * 5/1992 | Trian | 310/89 |
| 5,323,075 | * 6/1994 | Denk et al. | 310/68 B |
| 5,486,728 | * 1/1996 | Hirama | 310/40 MM |
| 5,997,261 | * 12/1999 | Kershaw et al. | 310/54 |
| 6,028,386 | * 2/2000 | Kech et al. | 310/194 |
| 6,036,456 | * 3/2000 | Peters et al. | 417/423.3 |

FOREIGN PATENT DOCUMENTS

| | | | |
|---|---|---|---|
| 240970 | 6/1995 | (AT) . | |
| 4404235 | 5/1995 | (DE) . | |
| 195 18 215 | 11/1995 | (DE) . | |
| 1222159 | 8/1996 | (DE) . | |
| 732794 | * 9/1996 | (DE) | H02K/5/128 |

* cited by examiner

Primary Examiner—Burton Mullins
(74) Attorney, Agent, or Firm—Herbert Dubno; Andrew Wilford

(57) ABSTRACT

A motor has a rotor rotatable about an axis, a can surrounding the rotor and having an outer surface, and a plurality of outwardly projecting stator supports fixed on the outer surface, and respective stator windings mounted directly on the stator supports. The stator supports project radially of the axis and there are at least three and at most twelve such stator supports and they are angularly equispaced about the axis.

20 Claims, 2 Drawing Sheets

SPLIT-TUBE MOTOR

FIELD OF THE INVENTION

The present invention relates to split-tube or can motor. More particularly this invention concerns a direct-current motor of the type used in a motor vehicle to drive the cooling fan or coolant pump.

BACKGROUND OF THE INVENTION

In a standard can or split-tube motor the stator windings are supported on and lie against the outer surface of the split tube or can. Normally as described in German 197 05 974 or in copending application Ser. No. 09/1396,108 the windings are carried on special supports that in turn are fitted to the can. These winding supports are therefore separate parts that add additional costs to the assembly and reduce the efficiency in the medium- and low-load applications.

In German patent document 44 38 132 it was suggested that the stator windings lie directly against the outer surface of the can. Installing such windings is quite difficult and expensive, and there is the danger that they might shift.

German patent document 1,222,159 describes a split-tube motor which is either provided with a pad or plate stack serving as winding support. This structure is also a part separate from the can so that it has the above-given disadvantages.

OBJECTS OF THE INVENTION

It is therefore an object of the present invention to provide an improved split-tube or can motor.

Another object is the provision of such an improved split-tube or can motor which overcomes the above-given disadvantages, that is which is simpler in construction than the known such motors and where the stator windings are solidly held in place.

SUMMARY OF THE INVENTION

A motor has according to the invention a rotor rotatable about an axis, a can surrounding the rotor and having an outer surface, a plurality of outwardly projecting stator supports fixed on the outer surface, and respective stator windings mounted directly on the stator supports.

This construction is extremely robust, inexpensive, and compact. The stator windings are solidly mounted on the can so they cannot shift from vibration or the torques encountered in normal use. The can with the stator forms a subassembly that greatly simplifies manufacture of the motor. Such a motor can be used in a wet or dry installation, that is the rotor can be lubricated and cooled by a liquid it is serving to pump.

The stator supports according to the invention project radially of the axis. This greatly eases mounting the stator windings in or around them.

Normally in accordance with the invention there are at least three and at most twelve such stator supports and they are angularly equispaced about the axis. In a standard motor four such supports spaced apart by 90° are used.

The stator supports can be stubs or cylindrically tubular. In the latter case they are outwardly cup shaped and contain at least part of the respective windings. Thus the windings can be formed directly on the supports of copper wire so that there is no need to bake on a subsequent lacquer coating.

The stator supports are according to the invention unitary with the can. They can just be molded with the normally plastic can although it is within the cope of this invention for them to be integrally mounted on the can, by welding or adhesive.

The motor according to the invention can be an electronically commutated direct-current motor or an asynchronous motor.

In accordance with the invention a contact support provided with terminals, e.g. of the mag-mate type, connected to the stator windings is mounted on the can and can in fact be unitarily formed with or integral with it. The windings are partially supported on the contact support. Thus there is no need for a separate terminal block. The can has a closed end supporting the contact support.

The motor further has according to the invention a fluid impeller carried directly on the rotor and a housing forming a fluid inlet and a fluid outlet together forming a fluid passage in which the impeller lies. The fluid can be water or air. In the former application the motor of this invention is ideally suited for use in a motor vehicle, for instance as a coolant pump or fan drive.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
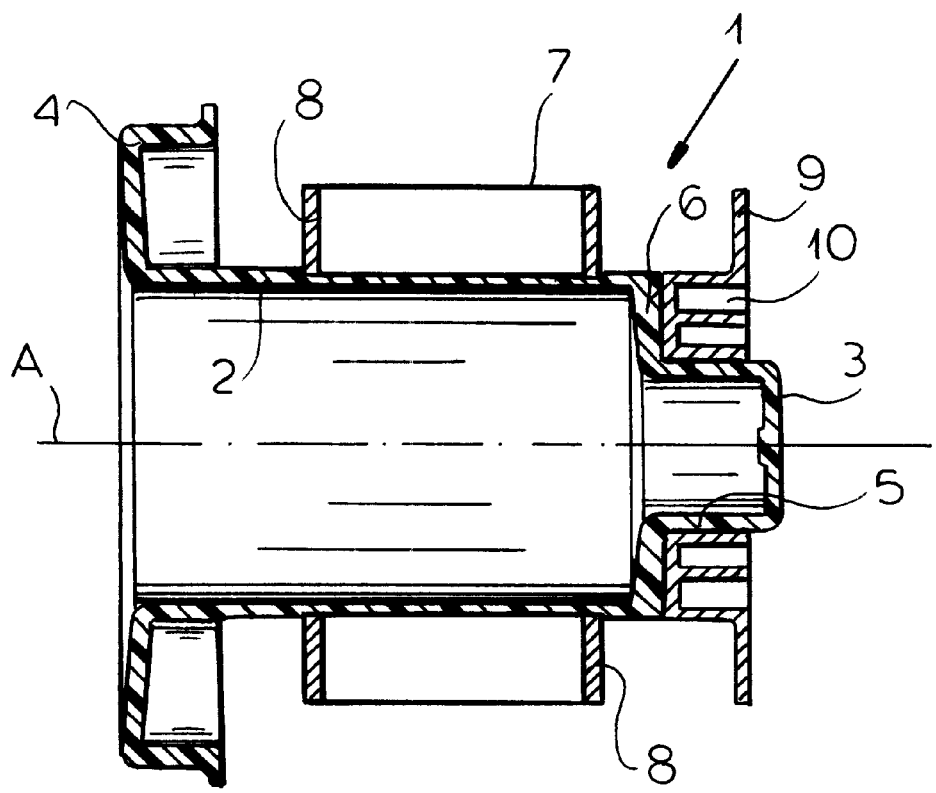
FIG. 1 is an axial section through the can of the motor of this invention.

As seen in FIG. 1 a can 1 for a split-tube motor has a cylindrical body 2 centered on an axis A and having one open end and an opposite end closed by a central transverse end wall 3. A mounting flange 4 projects radially outward from the open end. The closed end is stepped, having an annular shoulder wall 6 projecting radially inward from a rear end of the body 2 and a tubular axial extension 5 projecting from an inner periphery of the shoulder wall 5 to an outer periphery of the end wall 3. The parts 2, 3, 4, 5, 6, and 7 of the can 1 are made in one piece of plastic.

According to the invention four radially projecting tubular coil supports 7 with outer surfaces 8 are fixed on or unitary with the wall 2. The supports 7 are centered on respective axes lying in a common plane, intersecting the axis A, and angularly equispaced about the axis A. In addition the can 1 carries a contact support 9 which has mag-mate contacts for connection to windings 20 (FIG. 2) carried on or in the supports 7.

Figure 2:
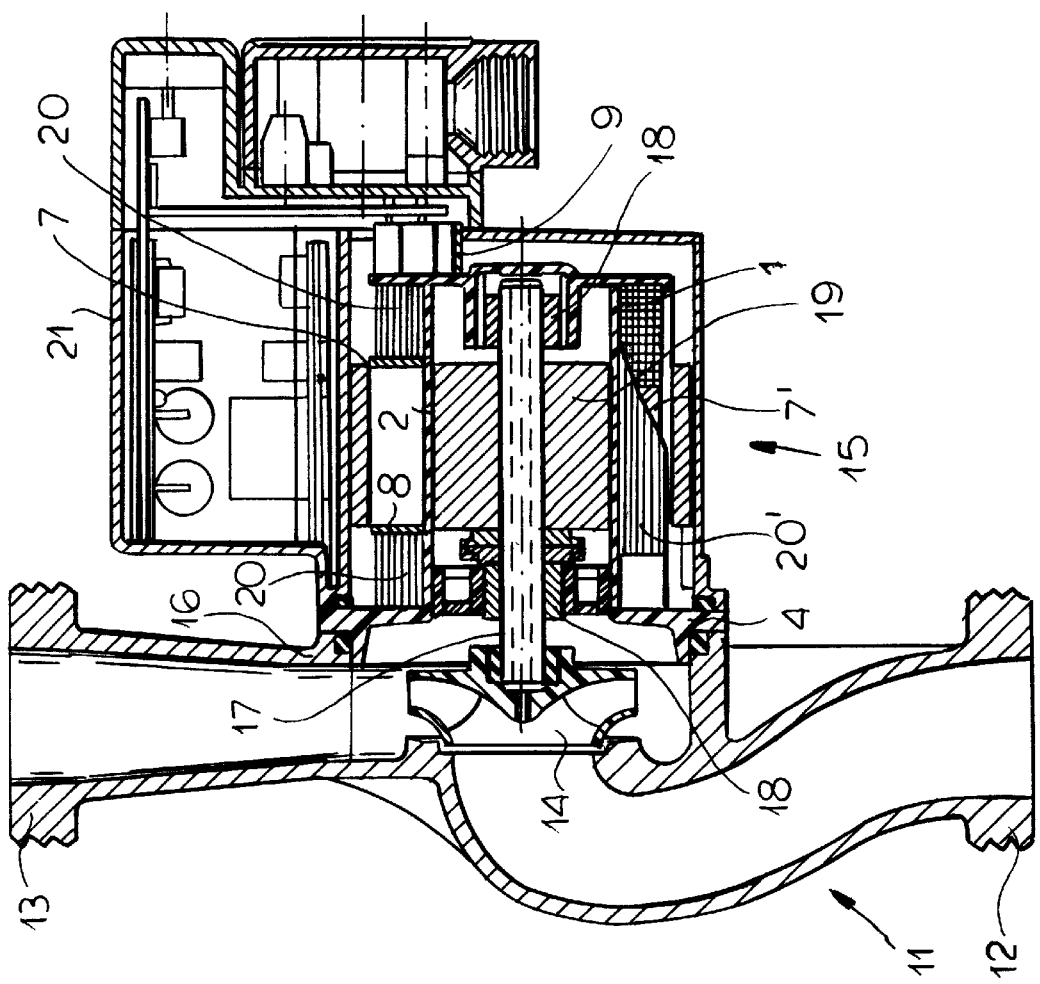
FIG. 2 is an axial section through a motor-vehicle water pump incorporating a can motor in accordance with the invention.

More particularly as shown in FIG. 2 a motor-vehicle coolant pump 11 has an intake pipe 12 and an output pipe 13 directing flow through an axial-input radial-output impeller 14 of the canned or split-tube motor 15 that is flanged directly to a housing 16 of the pump 11. A shaft 17 carrying the impeller 14 is seated in wet bearings 18 carried in the can 1 and carries a wet-type permanent-magnet rotor 19. Here the upper portion of the can 1 is shown with large-diameter cylindrically tubular supports 7 as in FIG. 1, and the bottom part with smaller-diameter solid stub supports 7' about which smaller-diameter coils 20' are wound. These coils 20 and 20' mounted on the supports 17 are energized by a control circuit 21 mounted right on the motor 15 and connected to these coils 20 and 20' via the connector plate 9.

We claim:

1. A motor comprising:

a rotor rotatable about an axis;

a can surrounding the rotor and having an outer surface;

a plurality of outwardly projecting stator supports fixed on the outer surface; and respective stator coils mounted directly on the stator supports and formed by winding directly on the stator supports fixed on the can.

2. The motor defined in claim 1 wherein the stator supports project radially of the axis.

3. The motor defined in claim 2 wherein there are at least three and at most twelve such stator supports and they are angularly equispaced about the axis.

4. The motor defined in claim 3 wherein the stator supports are stubs.

5. The motor defined in claim 3 wherein the stator supports are cylindrically tubular.

6. The motor defined in claim 5 wherein the stator supports are outwardly cup shaped and contain at least part of the respective coils.

7. The motor defined in claim 3 wherein the stator supports are unitary with the can.

8. The motor defined in claim 3 wherein the stator supports are integrally mounted on the can.

9. The motor defined in claim 3 wherein the can and stator supports are plastic.

10. The motor defined in claim 3 wherein the motor is an electronically commutated direct-current motor.

11. The motor defined in claim 3 wherein the motor is an asynchronous motor.

12. The motor defined in claim 3, further comprising a contact support provided with terminals connected to the stator coils.

13. The motor defined in claim 12 wherein the coils are partially supported on the contact support.

14. The motor defined in claim 12 wherein the can has a closed end supporting the contact support.

15. The motor defined in claim 12 wherein the contact support is integral with the can.

16. The motor defined in claim 3, further comprising a fluid impeller carried directly on the rotor.

17. The motor defined in claim 16, further comprising a housing forming a fluid inlet and a fluid outlet together forming a fluid passage in which the impeller lies.

18. The motor defined in claim 17 wherein the fluid is water, the motor being adapted for use in a motor vehicle.

19. A motor comprising:

a rotor rotatable about an axis;

a can surrounding the rotor and having an outer surface;

a plurality of outwardly projecting, cylindrically tubular, and cup-shaped stator supports fixed on the outer surface; and respective stator coils mounted directly on the stator supports and formed by winding directly on the stator supports fixed on the can, the coils being at least partially contained in the supports.

20. A motor comprising:

a rotor rotatable about an axis;

a can surrounding the rotor and having an outer surface;

a plurality of outwardly projecting stator supports extending from the outer surface and unitary with the can; and respective stator coils mounted directly on the stator supports and formed by winding directly on the stator supports fixed on the can.

* * * * *